Oct. 1, 1957          A. C. PETERSON          2,808,115

JET PROPELLED ROTOR SUSTENTATION AND PROPULSION MEANS

Filed July 22, 1954          4 Sheets-Sheet 1

INVENTOR

Adolph C. Peterson.

Oct. 1, 1957 A. C. PETERSON 2,808,115
JET PROPELLED ROTOR SUSTENTATION AND PROPULSION MEANS
Filed July 22, 1954 4 Sheets-Sheet 2

INVENTOR
Adolphe Peterson.

Oct. 1, 1957 A. C. PETERSON 2,808,115
JET PROPELLED ROTOR SUSTENTATION AND PROPULSION MEANS
Filed July 22, 1954 4 Sheets-Sheet 3
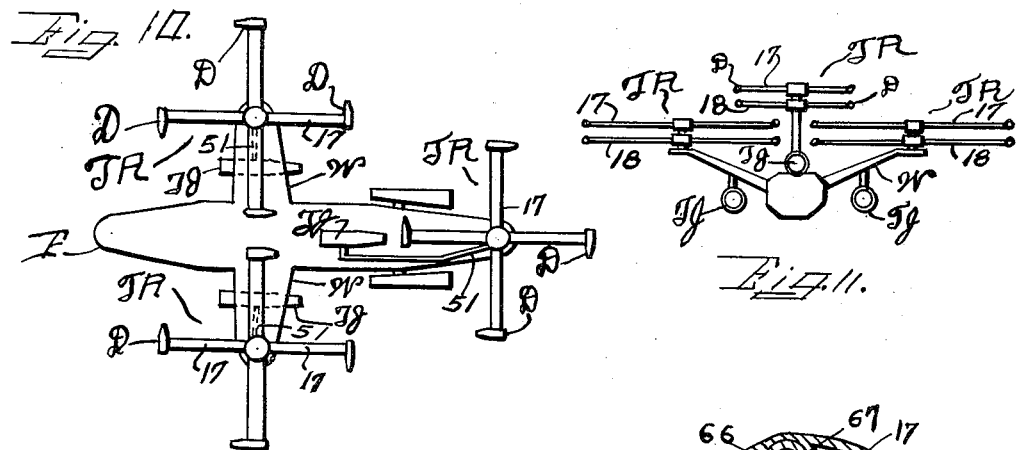
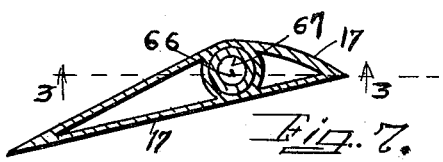
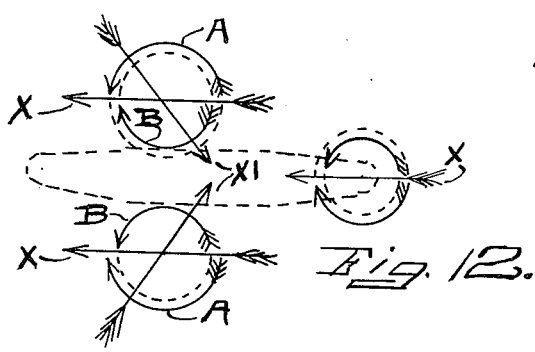
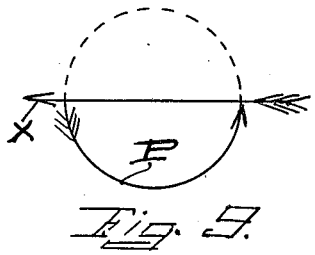
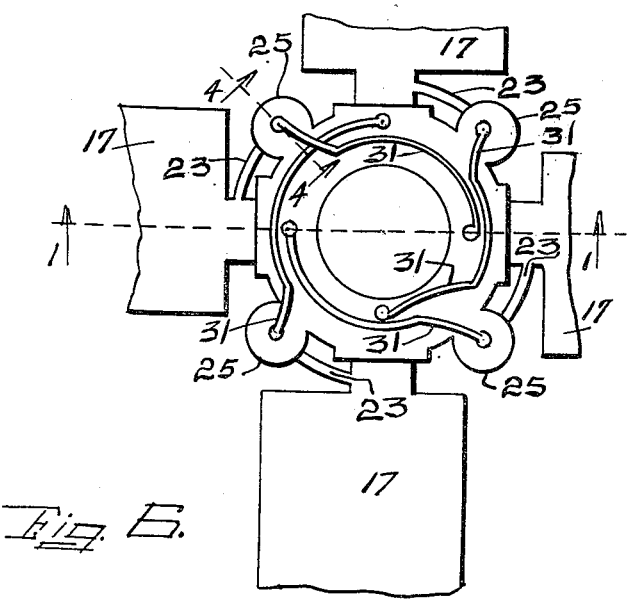
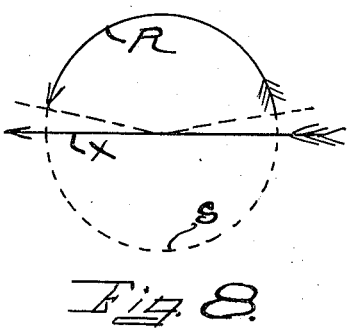
INVENTOR
Adolphe Peterson

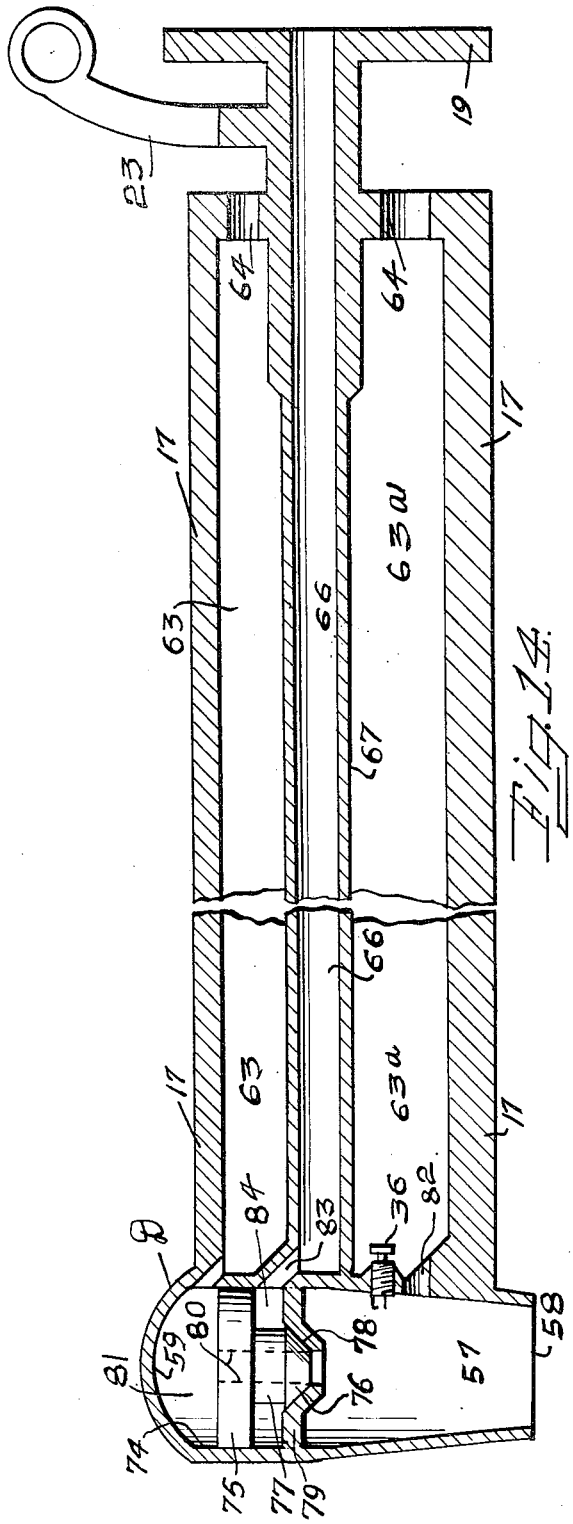
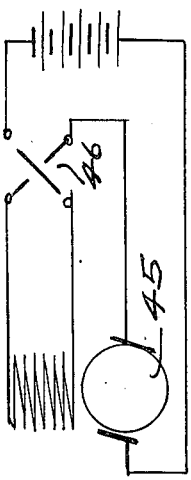

United States Patent Office 2,808,115
Patented Oct. 1, 1957

2,808,115

JET PROPELLED ROTOR SUSTENTATION AND PROPULSION MEANS

Adolphe C. Peterson, Minneapolis, Minn.

Application July 22, 1954, Serial No. 444,971

18 Claims. (Cl. 170—135.4)

My invention relates to rotor sustentation means and propulsion means for aircraft and especially to an improved form of such means with propulsion by jet means, wherefore it is called jet propelled rotor sustentation and propulsion means.

The principal objects of my invention are to provide a form of rotor sustentation means for aircraft, which means shall be simple in construction, somewhat lower in first cost of construction, somewhat lower in cost of operation and maintenance, and which especially shall have certain other advantages hereinafter especially enumerated. A chief object in this invention is the provision of a form of rotor propulsion means which, because of its especial and novel form of combustion and utilization of fuel, will provide an increased efficiency in that use of fuel for the propulsion of the rotor means and therefore also for the propulsion of the aircraft on which it is used. The efficiency of the utilization of fuel results in this invention, from two characteristics in the utilization of fuel, one, that the fuel is used only in such a manner that all the force of the jet propulsion is exerted in a direction, such that that force is completely effective for forward propulsion of the aircraft; second, that the force of the jet expulsion, by its reaction, is counteracted, as in the construction, by the rearward propulsion or thrust effect of the deepened phase of blade pitch, in the rotation, so that thus, simultaneously both forces are effective for the forward propulsion. Another reason for the effectiveness of the propulsion effect of the rotor means, consists in the fact that the rotor means by its own rotation, will provide also, some of the work needed for the provision, under a pressure, of some or a majority, or even all of the air, needed for the combustion to produce propulsion effect upon the rotor.

Another important advantage, which is provided by this invention, is the fact that the cycle and system of the device, in itself, provides automatically for production of the opposite phases of the blade pitch, including the deepened pitch phase of the cycle. A very important advantage consists in the fact that the system provides inherently a method of control of the direction of propulsive thrust upon the aircraft, which is effective in use of the aircraft, either in single units of the device or a multiple number of such units, this directional control of the units being especially effective for control to enable hovering of the aircraft or slow descent or landing and take off of the aircraft.

An especial advantage consists in the lessened first cost of construction, lessened cost of maintenance and operation, since the control means and operating means is more simple in operation, and less dependent upon mechanical operational elements. All of the advantages, enumerated, will appear in the description, and in general, it may be stated, that the object is the provision of better, cheaper, and more easily controlled aircraft. My device is applicable to use for such aircraft, as are entirely rotor sustained, or such as are partly rotor and partly fixed wing sustained, or such as are, in operation, convertable from one to the other form of operation, that is as fixed wing, or as propelled rotor sustained means.

In the accompanying drawings which illustrate my invention, like characters throughout, refer to like parts, in so far as practicable. The principal devices and combinations of devices, constituting my invention, are as hereinafter described, and as defined in the appended claims.

Referring to the drawings.

Figure 3:
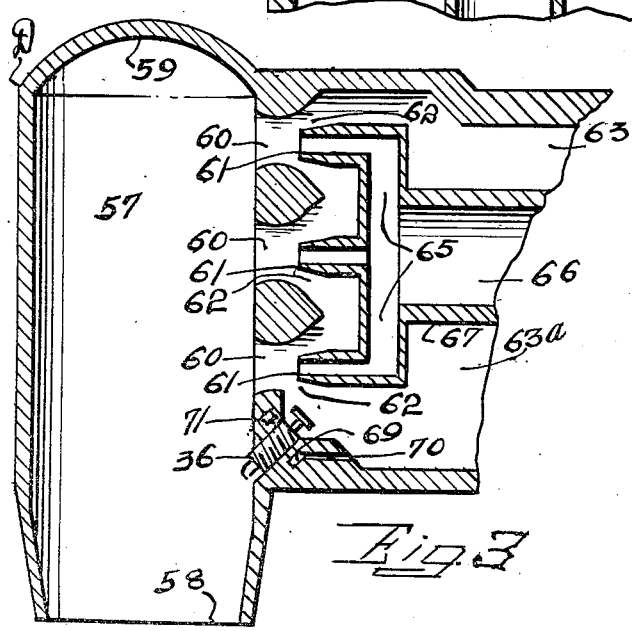

Figure 3 is a view in horizontal section through a jet unit at the radially outward end of one airfoil blade of a rotor, this section being a view looking upwardly, from below, at the section of a jet unit in a blade of the upper rotor. A similar section of a similar unit of the lower rotor would be the same, looking, however, downwardly, from above the section. This section is, in so far as the jet unit, is concerned, on the line 3—3 of Figure 7, and the blade is broken away.

Figure 2:
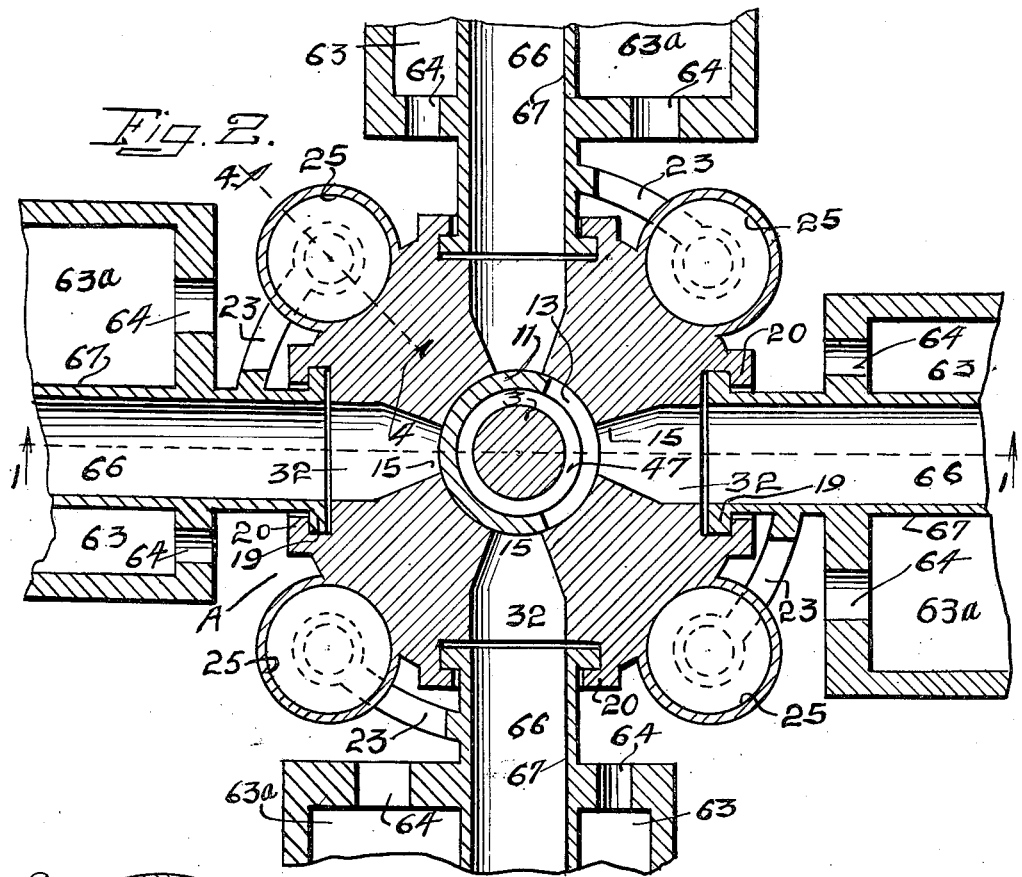
Figure 2 is a view chiefly in horizontal section, transversely to the plane of Figure 1, on a line 2—2 of Figure 1 through the chief elements of one rotor of the two rotor unit, and through the valve means, transversely thereof, some parts being in plan view, some parts broken away, the section being also on the line 2—2 of Figure 4, a detail view.

Figure 4 is a detail vertical section, on the line 4—4 of Figures 2 and 6, through the vertical axis of one pitch motor, a similar section, through any of the other four pitch motors, being essentially similar.

Figure 5:
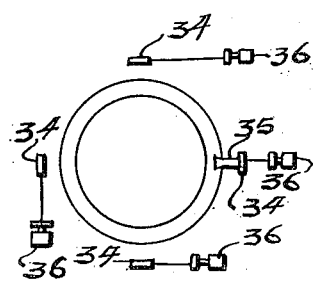

Figure 5 is a diagrammatic view of the ignition control or distributing means and its contact means as mounted on the valve.

Figure 1:
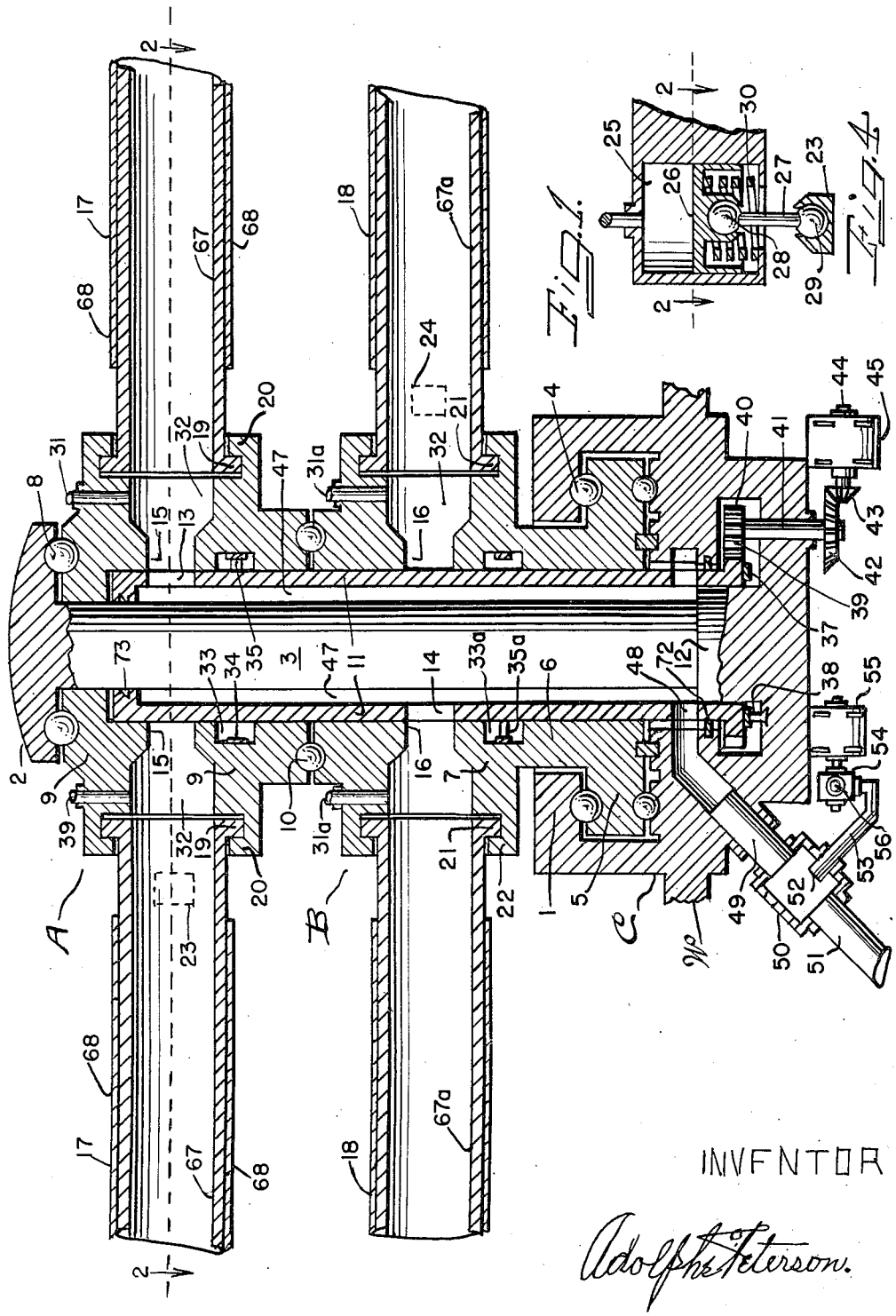
Figure 1 is a view chiefly in vertical section through the vertical operating axis of one so-called twin unit, which consists of two rotors, coaxially mounted on a single mounting pylon, some parts being shown in full vertical side elevation, some parts being broken away, the section being a section on the lines 1—1 of Figures 2 and 6.

Figure 6 is a plan view of the twin rotor unit illustrated in Figures 1, 2, this illustration being on a scale, approximately one-half that of Figures 1 and 2, and due to its very small proportionate size, being chiefly a diagrammatic view to illustrate the connections of the pitch motor fluid conduits and their connections, the air foil blades being broken away.

Figure 7 is a section vertically and transversely through one of the airfoil blades of a rotor of a twin rotor, on a somewhat smaller scale.

Figure 8 is a diagram illustrating the phases of the combustion cycle in one rotation.

Figure 9 is a diagram illustrating the phases of the cyclic pitch change in one rotation of a rotor.

Figures 10, 11, 12, are figures illustrating the mounting and control, of a system wherein there are three units such as the twin rotor unit, to be described mounted on an aircraft.

Figure 10 is a plan view of such an aircraft on a very small scale.

Figure 11 is a frontal view of that aircraft.

Figure 12 is a diagram illustrating the cyclic operation and control of this cyclic operation of the three twin units mounted on such an aircraft as illustrated in Figures 10 and 11.

Figure 13 is a diagram showing the reversing control of the motor 45, the switch 46 providing reverse and current stoppage.

Figure 14 shows a modified form of nozzle 57 and flow control.

Referring now to Figures 1 to 9, both inclusive, there is now described in detail, the mechanism comprising a twin rotor unit, according to my invention, this twin rotor unit being a unit comprised of two rotors, which are coaxially mounted on coincidental axes, and one of which is superimposed above the other on a mounting. The twin rotor unit has an upper rotor A and a lower rotor B, as generally designated. This pair of rotors are mounted upon a rotor pylon which is generally designated as C, and is fixed at the end of a wing or beam of an aircraft, which is designated W as to the wing. The mounting, in lieu of such a mounting, may be vertically over and upon any type of fuselage of an aircraft.

The mounting pylon C may be constructed of as many detailed elements as is necessary for construction and assemblage, the illustration showing it by its parts as they are united in a static fixture. Such illustration is adopted for all units or elements of the device in order that the illustration will show, primarily, the operative relation of parts, the construction of parts, in any manner, for proper assemblage, being a matter of design as necessary for effective construction.

The mounting pylon C has a supporting bearing 1, for the rotor B, and a supporting bearing 2 for the upper rotor A, and the two bearing means 1 and 2 are securely united together by the vertical post 3, these three parts, 1, 2, 3, being formed and united together in any manner, so that they will have co-incidental axes. A ball bearing 4 supports the bearing 1 upon the upwardly thrusting disk or flange 5 which is formed on the lower end of the sleeve 6 which is a part of and securely formed together with the lower rotor hub 7. A ball bearing 8 supports the bearing 2 upon the upper side of the upper rotor hub 9. A ball bearing 10 is placed between the lower side of rotor hub 9 and the upper side of rotor hub 7. By these ball bearing means, the two rotor hubs 7 and 9 are rotatably mounted to rotate with respect to the bearing means 1 and 2 of the mounting pylon so that their axes are co-incidental and so that these rotor hubs with their associated elements, are rotatable about the vertical post 3, each rotatable in one horizontal plane, the planes being parallel, the plane of one being sufficiently above the plane of rotation of the other, so that each will rotate independently of the other. The mounting is such that the rotors in rotation will transmit sustaining or lifting tension or effect upon the wing or beam element to which they are affixed.

There is a common valve member 11, which is in the form of a sleeve of rather large diameter and is placed over the post 3, that is about it, and at its base about the larger portion 12 of post 3, but this valve, which may otherwise be designated sleeve valve, is not engaged to the post 3, but is rotatable about the post 3 for control movements, although it is not rotatable with either of the rotor hubs, since this valve 11 is normally held static, and is not movable at all relative to the mounting pylon except for control, as may be required. The valve 11 is sufficiently long, longitudinally, that is, axially, so that a portion of it is stationed within and axially of the rotor hub 9, so that thus a portion of the surrounding material forming each rotor hub is close to and rotatable on the surface exteriorly of the valve 11, to form with the valve 11 a valve means which will cyclically permit the air and fuel flow as hereinafter described. A portion of valve 11 is axially within hub 7.

The valve 11 has a port 13 which is associated with the rotor hub 9 and has a port 14 which is associated with the rotor hub 7, that is these ports are, one in the plane of one rotor hub and the other in the plane of the other rotor hub. The ports 13 and 14 are at diametrically opposite locations with respect to the axis of the valve 11, so that timing, is for one rotor hub A, so that rotation is in the counter-clockwise direction, and so that rotation for the other rotor hub B is in the clockwise direction. Each of the ports 13 and 14 is approximately 160 degrees long or slightly less than 180 degrees long circumferentially of the valve 11, and this results in such timing in cooperation with the ports 15 of rotor hub 9 and ports 16 of rotor hub 7, that flow of fuel bearing fluid, gas, air and fuel or other type fuel and gaseous fluid, will take place to each of four air foil blades 17 of the rotor hub A and 18 of the rotor hub B in cyclic order for the blades of each rotor, and during a period which is approximately 180 degrees, or slightly less, of the rotation of the rotor, in each case. The air foil blades 17 are each mounted and fixed to the rotor hub 9 by bearing flanges 19 formed one on each blade 17 and oscillative in a bearing or blade bearing 20, one for each blade 17, the mounting of blades 17 being such that each blade is independently of the others oscillative on an axis which is horizontal as a radius of the circle about the rotor hub 9. The air foil blades 18 are each mounted and fixed to the rotor hub 7 by bearing flanges 21 formed one on each blade 18 and oscillative in a bearing or blade bearing 22, one for each blade 18, the mounting of blades 18 being such that each blade is independently of the others oscillative on an axis which is horizontal and extends in the plane of rotation of rotor hub 7 and substantially as a radius of the circle about rotor hub 7. The oscillation permitted to blades 17 is such that they may have the pitch angles for effective sustentation, when rotor hub 9 rotates in the counter-clockwise direction, and the oscillation permitted to blades 18 is such that they may have the pitch angles for sustentation when rotor hub 7 rotates in the clockwise direction, each as viewed from above.

Each blade 17 has an arm 23 which extends substantially at right angles from its axis of oscillation, and each blade 18 has an arm 24 which extends at right angles from its axis of oscillation. The general features of the rotors A and B, which have been described, will identify each of these rotors as independently rotatable rotors, each having its blades 17 or 18, and each having a relation as indicated to valve 11. Since only the one rotor A, is fully described, and fully illustrated in the drawings, it should be understood that each rotor is like the other and has all the elements that the other has but that they are so constructed that one is rotatable in one direction and the other in the opposite direction. The description of detailed other elements will now be related only with respect to rotor A, the rotor B being similar but not being described further in detail.

Referring to rotor A, the rotor hub 9 has formed in it at locations disposed circumferentially of the rotor hub 9 and at points spaced ninety degrees, four pitch motor cylinders 25, each of which is placed to have a vertical axis, and there is placed in each a reciprocable piston 26 which is connected by a connecting rod 27 with the associated and adjacent arm 23 of the associated air foil blade 17, the connections with the piston and the arm being by ball and socket joints, as shown, or equivalent, 28, 29, so that there may be a sufficient degree of flexibility of angle in the reciprocation of the arm by the piston, and the relation is such that in downward movement of the piston 26 under pressure above it, it will press downwardly upon the arm 23 and thus move the rearward side of the associated blade 17, relatively downwardly, to increase the pitch angle of the blade 17. The joints 28 and 29 are such as to impart either tension or downward thrust.

A spring 30, in each cylinder and piston unit 25—26, serves to yieldably return the piston upwardly and pull the arm 23 upwardly, but this spring 30, of each unit, need be only of rather low power since the blades may be so made, with trailing parts larger in plane aspect, than leading parts (with respect to axis of oscillation), so that the return of the blade to a lower pitch angle, that is lesser pitch angle, will tend to be automatic, when fluid pressure is released from the cylinder 25. Preferably the springs 30, are incorporated, although these may be omitted and the return oscillative movement may then be automatic. Each cylinder 25 has or may have intake of gases under pressure by means of one associated independent conduit 31, the conduit 31 of one cylinder 25 being thereby connected to one port chamber 32 which is associated with a blade 17 which is diametrically opposite to the blade 17 with which the particular cylinder 25 and its piston 26 are associated. It will thus be seen that any port chamber 32 (associated with a blade 17) may deliver gases under pressure through its connected conduit 31 to the pitch motor cylinder 25 of a diametrically opposite blade 17 from that with which the port chamber 32 is associated, so that pressure of gases in a blade 17, may, as hereinafter related, deliver gases or air and fuel fluid under pressure to the pitch motor cylinder of a blade 17 which is passing through a phase which is the opposite of the pressure and combustion phase of the blade connected with the particular port chamber 32.

The rotor hub 9 has formed in it an annular channel 33 about valve 11 and in this channel four contact elements 34 are placed, each fixed to the surrounding wall of the rotor hub 9. One single contact brush 35 is fixed on the side of the valve 11. Thus the contacts 34 will rotate about the brush 35, contacting it in cyclic order. Relative time of contact will be shiftable, according as valve 11 is shifted, as hereinafter described, for control. Each contact 34 will thus pass ignition current to its associated spark plug 36, in cyclic order, as current is received by way of contact brush 35, which is connected by way of contact ring 37 fixed on the extreme lower end of valve 11, and contact brush 38 fixed in the mounting pylon C, the current being supplied to brush 38 by any means, not illustrated, as ignition spark plugs are generally supplied with current. Leads or conductors for the current for ignition are passed through conduits formed in the metal of the valve 11 and in the metal of the rotors A and B, such conductor conduits being as usually formed in any apparatus.

The valve 11, at its lower end, has formed on it, circumferentially of it, a spur gear 39 and a small spur gear 40 is in engagement with that gear 39, and spur gear 40 may be rotated in either direction by its shaft 41 having bevel gear 42 on its lower end and bevel gear 43 which is fixed on the shaft 44 of electric motor 45. The motor 45 is a reversible electric motor which may be equipped as control motors are usually equipped and which may be supplied with control current by any form of current control for reversing operation of the motor 45 and for controlled period or length of operation, as such means is commonly used in connection with control motors, and for remote control thereof, such control means not being illustrated in detail. The control must be such that the valve 11 may be turned about post 3 and within the rotor hubs 9 and 7, to such particular position for control, as is desired. The reversing switch 46 provides for reverse operation. Any form of indicating means in connection with valve 11, may be used, but it not especially shown, since such indicating means are now commonly used in connection with machinery and now need not be particularly shown, therefore.

Each of the rotors A and B, will have the means as has been described, and detail means, such as is visible, in the illustrations and as is associated with rotor B, is designated by the same numerals as with rotor A, but with addition of letter "a." The valve 11 is sufficiently large in diameter, throughout a portion of its length, that there is formed an annular chamber 47 about post 3, and to this chamber 47 a port 48 in valve 11 may deliver from a carburetted air conduit 49 and the latter may receive carburetted air from carburettor chamber 50, to which air under pressure is delivered, by the means as hereinafter described, or by any means, from conduit 51, and to which fuel is delivered by nozzle 52 from pipe 53 as received from fuel pump 54 as operated by electric motor 55. This electric motor 55 is operated by any remote means supplying current, and fuel is supplied to pump 54 by supply pipe 56.

The end of each air foil blade 17 has formed or fixed on it a so-called jet discharge means or discharge means, generally denoted D, and illustrated in detail in section through the horizontal axis of the jet tube, in Figure 3. This discharge means has a jet tube 57 which is fixed on the end of the blade 17 and is placed generally as a chord of the circle in which the end of the blade 17 moves in rotation of the rotor hub, and its discharge aperture 58 is so placed that it is directed rearwardly of the direction of movement of the blade in the rotation of the rotor hub and is directed in the plane of that rotation so that discharge from it will flow rearwardly of the movement of the blade end and in the direction of the chord of the circle in which the end of the blade moves. The jet tube 57 is closed at its opposite end by the wall 59, but it is open at one side by three so-called injector nozzles 60, each of which is shaped somewhat as a venturi tube is shaped, and has located axially in it, one of three inductor nozzles or gas discharge nozzles 61, there being a space 62 about each such nozzle through which atmospheric air may enter from the spaces 63 and 63a which pass in the blade 17 radially inwardly, of the circle of rotation of the rotor hub 9, to the radially inward end of the blade to ports 64 which latter are open to the atmosphere and through which atmospheric air is inducted, as hereinafter described. The gas discharge nozzles 61 all receive gaseous fuel or air and fuel mixture through the common connecting passage 65 which is connected to and open to the gaseous fuel mixture or gaseous fuel bore 66 which is formed interiorly of the tubular beam 67 which may be a supporting beam or the chief supporting member of the blade 17, and to which the air foil sheathing or skin member 68 is firmly attached to form the shape transversely of an air foil blade. The spaces 63 and 63a are formed between the beam member 67 and the sheathing 68 and are spaces in which the cool atmospheric air from ports 64 passes and is compressed by the rotation of the rotor and the centrifugal force generated by the rotation on the atmospheric air which is in the spaces 63 and 63a. Thus the blade in its rotation, acts as a centrifugal pump vane member in producing centrifugal force on the atmospheric air in spaces 63 and 63a and thus acts to pump atmospheric air through ports 64 and through spaces 63 and 63a, to compress that air in the radially outward end of the spaces 63, 63a, so that atmospheric air is thus compressed and delivered as compressed air to the space 62 about each nozzle 61 and there is subjected also to the induction effect of the nozzles 61 so as to then force that air with the fuel mixture gases into the jet tube 57 where the resultant mixture is ignited by the ignition spark plug 36, which receives distribution of ignition current, at such time that ignition will be effected immediately on the entrance to jet tube 57 of any of the air and fuel mixture from the nozzles 60. There is formed about each spark plug 36 in the blades 17, an annular space 69 into which a proportionately very small quantity of atmospheric compressed air is passed by way of the very small passage 70, this air being discharged by another very small aperture 71 into the gas stream in the jet tube 57, this small stream of cool air thereby serving to cool the spark plug 36. The rotor hubs may have any packing such as that at 72 to prevent loss of fuel mixture, and the valve 11 may have such packing as 73 also to prevent such fuel loss.

The operation and cyclic actuation with respect to the twin rotor unit is now described. The cyclic operation of each one of the pair of rotors A and B, constituting one twin rotor unit, will be first described by describing this operation with respect to the rotor A and especially with regard to Figures 1, 2, 3, 4, 5, 6, 7, 8 and 9. It will be understood that the conduit 51 supplies air compressed to a pressure which may be say fifty pounds to even one hundred pounds per square inch, this pressure depending on the construction, the predetermined strength of parts such as blades 17. In this connection it may be noted that the tubular beam member 67 of each blade may be constructed of steel or other strong metal and that the sheathing forming the air foil surface of blades 17 may be constructed of any lighter metal or material, and also that the jet tubes may have lining their inner walls any refractory or insulating material which will adequately prevent damage to the metal of the jet tubes, but such tubes should be made of such resistant material as a steel alloy or a metal such as titanium which will be more resistant to heat.

The nozzle 52 will be caused to supply fuel such as gasoline, kerosine, alcohol or other combustible fuel, such as gas fuel produced by liquified petroleum gas, or even coal gas, and any such fuel will be supplied under a sufficient pressure, and will be supplied, in operation, in a continuous supply, the pump 54 being operated as necessary by motor 55, as controlled by any remote control means. Air will start to flow to carburetor chamber 50 where fuel is supplied and the carburetted mixture will flow through the ports 48 to annular chamber 47 about post 3, between it and valve 11, thence as controlled by valve 11, in cyclic order, through the ports 15 of rotor hub 9 as controlled by port 13 in valve 11, and this carburetted mixture will enter the space or bore of the tubular beam members 67, and will pass to the mixture forming nozzles, which have been described, as at the end of each blade 17, and discharging to jet tubes 57.

The contacts 34 of the ignition current distribution means should be of such length that there may be at any position of the rotors ignition current distributed for at least one or two of the spark plugs. Ignition and fuel distribution, will readily take place if the aircraft bearing the device, is in the air, since then rotors would automatically rotate sufficiently to produce the distributing movement of the valve means and distribution of ignition current. On the ground for take-off, any means may be used to give initial rotation, if prevailing air currents do not suffice. It may be noted, however, that the air and fuel as supplied under pressure will, by that pressure alone, create some rotation producing impulse by ejection of the air from the jet tubes. As combustion is effected in jet tubes 57, the combustion and heat produced in the gases will greatly increase the force of expulsion of the gases from the jet tubes 57 to atmosphere, and thus the work performed will be greatly increased, and the rotors A and B will start rotating in opposite directions, at high speeds. The jet tubes of rotors A and B, being oppositely directed, in the planes of rotation, the opposite rotation will be effected, always. A cycle of combustion will be effected in each blade of each rotor. This cycle, is diagrammatically illustrated in Figure 8, where X indicates direction of propulsion by the rotor (single rotor) and this may be also the direction of translational flight, and arrow R and that arc of the circle of rotation indicated by arrow R indicates the combustion phase and period in the cycle, and the remainder of the cycle, about 180 degrees, more or less, indicates the phase wherein there is no passage of fuel mixture by way of valve 11 and its port to the bore of the beam member 67, and in which consequently there is little or no combustion in the particular jet tube 57. During phase R there is combustion in the jet tube, and continued passage of combustion gases to the jet tube 57, and continuous discharge from the particular jet tube of gases under combustion and great heat. The phase R will be a so-called rotor combustion phase, in which the particular blade is in the movement advancing in the direction of aircraft propulsion, and the remainder of the cycle indicated by letter S is the retreating phase of a blade in which the blade will move rearwardly, relatively, and in which there will be no combustion, or a very slight combustion. The discharge apertures of the fuel nozzles 61, will be so restricted in transverse size, that the discharge of fuel fluid is restricted, comparatively, and so that therefore there will immediately be a build up of pressure in the bore of the beam member 67 of the blade, when the blade receives fuel fluid. This restriction in the size of the fuel ports, results in two effects, one, the build up of pressure in the beam member 67 which will produce the pitch motor effect, hereinafter described, and two, the accelerated and rapid discharge of fuel fluid to produce a strong flow of combustion gases from the jet tube 57. The ports in valve 11 are also so large in proportion that there is the rapid build up of pressure, as stated.

The discharge of combustion gases from jet tubes 57 will be of the nature of jet discharges, which produce reaction effects and thus propulsion, and this effect will be very effective for rotation of the rotor when speed is attained, because that speed of rotation, at the ends of blades 17 (and 18) will be say six hundred to one thousand or even more rotations per minute, which will produce a speed at blade tips of perhaps some six to nine hundred miles per hours. When the blade 17 (or 18) has reached the forward position, at the tip of arrow R, combustion is completed and gases discharged to near atmospheric pressure. The centrifugal effect on air in spaces 63, 63a continues, however, and atmospheric air will be continuously pumped through these spaces to the jet tubes 57, during the retreating phase of the blades, thus continuing a cooling effect and also some jet discharge effect, at lower pressures, and speeds, however. This cycle of combustion, with discharge under the powerful effect of combustion, and the non-combustion (relatively non-combustion) in the remainder of the cycle, carburetted air flowing during the combustion phase and ignition being effected at commencement of the combustion phase, continues in cyclic order and succession, and each cycle produces a forward propulsive thrust by discharge of combustion gases at high speed, in the one phase, only, the phase of rotation, when the blade is advancing in the direction of translational flight, and when discharge of combustion gases is rearwardly directed of the direction of translational flight.

During the phase R, as indicated in Figure 8, when there is the pressure of gaseous fluid flow in the bore of a beam member 67, this pressure is communicated by passage of the fluid through the conduit 31, connected with a particular blade, to the connected pitch motor cylinder 25 of the diametrically opposite blade, as indicated in Figure 6, and this pressure effect in the motor cylinder 25 produces downward movement of the piston 26 in the cylinder 25, and accordingly downward movement of the trailing edge of the said diametrically opposite blade 17 (or 18) and thus the blade (receiving the pressure in its cylinder 25) is, in the combustion phase of its diametrically opposite blade, forced to the high pitch angle in the retreating movement of the blade (rearwardly), and thus that high pitch angle produces a high degree of backward thrust on the atmospheric air and a high degree of forward propulsive thrust on the blade and thus on the aircraft on which it is mounted and this forward thrust is combined with the forward thrust produced by the discharge of combustion gases in the mated or opposite blade, and thus there are two thrust forces which, combined and simultaneously, produce forward propulsive thrust on the rotor and its mounting.

When any cylinder 25 has received gases under pressure that pressure persists as long as the pressure persists in the phase R, of a blade, but when that pressure is reduced by closing of the valve port in valve 11 and rotor hub 9 (or 7) the piston 26 will be permitted to move upwardly, this being effected partly by pressure of the coil spring 30 and partly by the pressure of the passing slip-stream air, on the trailing edge of the connected blade 17 (or 18), and therefore the blade pitch angle is permitted to be reduced. This reduction of the blade pitch angle, will take place, just before the combustion phase R is initiated in that particular blade.

Having described the cycle and phases of one rotor A, it may be stated that the other rotor B of the twin unit, has the same cycle of combustion, phase R, and non-combustion or discharge in the remainder of the cycle, and also the same change of pitch angle in the diametrically opposite blade of any mated pair of blades, and since the rotor B is constructed to have opposite rotation, the valve 11 having the port 14, is oppositely located and ignition takes place in a corresponding point of the cycle, oppositely, this rotor B, produces combustion propulsive thrust by gas discharge in the phase on the opposite side of the axis of rotation, to that of rotor A, and also produces propulsive thrust by high pitch angle of blades on the side oppositely (that would be the same side as the combustion side of rotor A) and thus the twin rotor unit has the combined thrust of two combustion phases on opposite sides, and also of two high pitch angle phases, also on opposite sides, and there is combined thusly, sixteen thrust phases, on the twin rotor unit, in each single cycle of the pair of rotors.

It should thus be observed, that the sixteen thrust phases of a twin rotor unit, are all directed to exert forward thrust in the same direction, and that accordingly propulsive thrust will be according to the direction of this combined thrust of a twin rotor unit. In Figures 10 and 11, there is illustrated a mounting of three twin rotor units on an aircraft, each twin rotor unit is designated as TR, and two of these are placed at opposite sides of the aircraft fuselage F, in line transversely of the aircraft, and one a smaller one, is placed near the rear end of the fuselage, all a little above the level of the fuselage F. Each twin rotor unit has its supply of compressed air and fuel, as has been described in connection with one twin rotor unit. Thus there are twin rotor units at three points and each may be separately controlled in its power output, by any means, or such as described, and each may be separately controlled in its direction of thrust of the unit. The direction of thrust of a twin rotor unit, in the horizontal direction may be controlled by the pilot by his remote control of the motors 45 of the twin rotor units. Each valve 11 of a unit may be turned through ninety degrees, or 120 degrees, or 360 degrees or as desired. Normally in forward translational flight, each twin rotor unit will exert thrust in the same forward direction, as indicated by arrows X in Figure 12, a cyclic diagram of the thrust action. In the position of arrows X, all three units have their valves 11 stationed so that the thrust is all, in all three units, directed for forward propulsion, in the direction of forward flight, horizontally. For hovering flight, or for take-off vertically, or for slow descent, the pilot may set the valves 11 of the two forward twin rotor units TR, by motors 45, so that the direction of forward thrust of the units is directed in the direction of arrows X1, Fig. 12, and by a setting such as this, the direction of thrust of the two forward twin rotor units TR is directed to negative the forward propulsive thrust of the rear twin rotor unit TR, and thus all horizontal thrust is negatived, or neutralized, so that the aircraft may while being supported in the air, hover without horizontal travel. When in this condition of control, the pilot may if he desires (or at any time), increase the power of the turbines hereinafter described, and he may increase the flow of fuel to the carburettor means 50, and this increase of power and pressure correspondingly, will tend to increase the pressure in each of the pitch motor cylinders 25, and this increase of the pressure, will simultaneously increase or deepen the pitch angle of the blades 17 (or 18), and this will increase the vertical climbing effect. Increased climb effect may also in like manner be provided for any one of the three twin rotor units TR, thus providing a means for at any time effecting a restoration of equilibrium to the aircraft, if that is at any time necessary.

The aircraft will be provided with turbine jet type or other propulsion power plants, each designated TJ, there being three of these shown in Figures 10 and 11. Each turbine jet unit provides compressed air, withdrawn from the compressing section, by a conduit 51, each turbine jet unit thus providing compressed air, say at fifty to one hundred pounds pressure, to one associated twin rotor unit TR. The conduits 51 may be united in any manner, so that any of the turbine jet units may supply compressed air to any twin rotor unit. The turbine jet units TJ, in the usual way of such units, or any other propulsion engines, may supply forward propulsion by their rearwardly discharging jets or by other means, such as propellers or ducted fans. This propulsion may be modified by modification or control of the power output of each, but such propulsion effect may be partly or fully negatived or neutralized by control of the valves 11 of twin rotor units to provide opposite propulsive effect. The turbine units TJ may also have any means, such as is now known, for changing the direction of propulsive thrust. The valve control of the rearward unit TR, Figure 10, may be used to effect turning of the aircraft in the horizontal plane, as may be necessary. Any form of compressed air supply means may be used instead of the supply from the turbine jet units, as stated, and such units may have any type of horizontal propulsion device, such as propellers, or ducted fans.

Referring to Figures 10, 11, it will be seen, that the structure as there shown will provide, for forward translational propulsion, in each cycle of operation of the units, forty eight forward thrust propulsions, in addition to the three major forward propulsion forces of the turbine engine units TJ. Each twin rotor unit provides in each of the rotors, four combustion gas thrusts, all discharging rearwardly to give forward propulsion, and four rearward high pitch angle thrusts of its blades, all providing forward propulsion in addition to their sustentation effect, and thus there is a very large total propulsion effect. The turbine jet units may be so proportioned in their power effects, so that much of their power output is utilized for provision of compressed air for the twin rotor units TR, and thus a lesser proportion for forward propulsion, or they may according to the characteristics desired, provide a greater proportion of forward propulsion effect in their normal operation. This proportion in construction and design, will be affected also by the proportion of lift desired and provided by the proportioning of the fixed wings W which are mounted on the fuselage F and to which the side TR units are affixed.

It will be seen by examination of the diagrams, that there is at no time, in forward flight propulsion, any thrust of any twin rotor unit, element, oppositely to that for forward propulsion (except slight effect provided by low pitch angle or very low pitch angle or even no pitch angle in advancing phases) since the high pitch angle is effected in the rearward or retreating movement of the blades 17, or 18, see Fig. 9 (P indicates the phase of high pitch angle), and since the propulsion means for the blades, effected through the discharge ports 58 for the jets, is effective only in the direction opposite to the direction of forward flight of the aircraft, and thus all of the propulsive effect of discharge of gases from the blades of rotors, is effected rearwardly to provide thrust for forward propulsion of the aircraft, and that thus the combustion thrust effect is very effective, and highly economical in its expenditure of power and of fuel provided by the combustion.

The bores 66 of elements 67 are subjected to centrifugal force and also suction effect created by nozzles 61 on passages 62, during the combustion phases. The pistons 26 of motors 25 are during the non-combustion phases of the discharge jet nozzles, subjected to some suction effect from the bores 66, which aids in the return movement of the pistons 26 and therefore also the return movements of the blades 17 or 18.

It should be noted that in the combustion phases of any of the blades, the ignition points should be such as to effect ignition immediately on the initiation of flow of the fuel and air under pressure through a nozzle 61, and the distributing contacts for the ignition means and the conductors, should be so arranged as to effect this immediate ignition on the commencement of flow of fuel and air; and the ignition means should be of any type which will be most certain to effect such immediate ignition.

I have shown the device as constructed to pass compressed air by pipe 51 to carburetor 50 and fuel by nozzle 52, but it should be noted that the fuel fluid may be of any type, liquid or gaseous, and that the air flow by pipe 51 may be omitted, or this flow by pipe 51 may be a gaseous fuel such as a liquified petroleum gas, under pressure, or it may be a coal gas under pressure. And it may be noted, also, that in some constructions, all the air for combustion may be distributed by means of the pipe 51 and the valve 11, as the air and fuel combination, are shown to be distributed. Or, alternatively, all the air for combustion, may be received from atmosphere, by way of the ports 64, and as compressed by the spaces 63 in blades 17, may be discharged through the spaces 62 and nozzles 60 and mixed with the fuel from nozzles 61 in nozzles 60.

Referring to the modified form of nozzle means shown in Figure 14, this shows merely a different form of the nozzle means at the end of each blade 17 (or 18), and the blade itself and its phase change arm 23 and flange 19 and mounting in the rotor hub, and its association in the rotor hub 17 (or 18) is like that for the first form described, relative to operation of the rotor hub means, its valve 11, and the posts of the valve 11, and the reception of compressed air bearing fuel, and the distribution of this air and fuel mixture. This is all as in the first form. The nozzle 57 is however, constructed to have an additional control of the flow of compressed air and fuel by means of the bore 66 to the nozzle 57.

There is formed in the nozzle means D, at its end opposite to the discharge 58, a cylindrical chamber 74, with axis co-incidental with the axis of nozzle 57, and this chamber 74 has a piston 75 reciprocable therein. The piston 75 has secured to it a conical valve 76 so that the latter may be controlled by the piston 75 through the valve stem 77, the valve 76 being normally seated on the seat 78 in dividing wall 79 which separates the nozzle 57 from the chamber 74. The valve stem 77 and valve 76 and piston 75 have bored axially through them a passage 80, shown by dotted lines in Figure 14, so that there is thus a free passage of air from the space 81 above piston 75, but this passage 80 is not so large as to permit too free flow, so that pressure may be accumulated in space 63. There is restricted flow also by way of port 82 from space 63a to nozzle 57. The air flow from spaces 63 and 63a through passages 80 and 82 may thus be continuous but is not so free as to prevent accumulation of pressure in spaces 63 and 63a, and therefore also some accumulation of pressure in the space 81 above piston 75. This pressure above piston 75 serves to normally keep the valve 76 seated, so that thus flow is not permitted from bore 66 of pipe 67 except when valve 76 is lifted from its seat by a pressure in pipe bore 66 greater than the pressure in space 63. This greater pressure will occur in each period when the port 13 in valve 11 (or port 14 for rotor B) permits the air and fuel mixture to flow to bore 66 of a blade 17 (or 18), and thus at this period in a cycle, the greater pressure in the bore 66 will, flowing through the port 83 to space 84 below the piston 75, cause the piston 75 and its valve 76 to be lifted from seat 78, and at this time the air and fuel mixture under pressure is permitted to flow from space 84 to nozzle 57, mixing with air flowing through passage 80 and port 82 to nozzle 57. The resultant combustible mixture will be ignited by ignition element 36. Except for the restriction of flow from bore 66, during periods when flow through port 13 is shut off, the operation is like that in the first form described. The restriction of flow from bore 66 during the periods of the cycles when port 13 (or 14) of valve 11 does not permit flow, results in a slight improvement of fuel economy, and this means of flow restriction by valve 76, may be used in some constructions, as may be desired, although it may be usually desirable, for the sake of simplicity in construction, and freedom from any difficulties of operation, to omit this flow restriction by valve means 76 and instead to use the means, as is shown in the first form for provision of the mixture of carburetted air and air. In the latter event, the flow from bore 66 through nozzle 57 will, during the non-combustion periods of cycles, be only such as to reduce pressure in bore 66 and produce very slight combustion in the nozzle 57, and such slight combustion may be found desirable, in some constructions to more definitely insure ignition and combustion during the pressure periods. In the use of the modified means of Figure 14, all blades 17 (or 18) will have this modified nozzle construction, and it should be noted, also, that the pressure in bores 66, during pressure periods, must be so much greater than the retained pressure, created by pressure in space 63, that the alternation of pressure in the pitch motor cylinders 25, will be of such magnitude, that the pitch change movement is effectively procured, such difference of pressure, as may be necessary, being not great; since the blades 17 may have such large trailing areas, as to procure somewhat automatic pitch change.

While I have shown, particular devices and combinations of devices, in the illustration of my invention, I contemplate that other detailed devices and combinations of devices, may be used in the realization of my invention, without departing from the spirit and contemplation thereof. The bores 66 in pipes 67 and the ports should be so proportioned as to secure a speed of flow to prevent flash-back of combustion in bores 66, but any such known devices as screens may be utilized to prevent such flash-back, in the event that the proportion of air to fuel in bores 66, in any designed construction is such as to induce or permit such flash-back of combustion. Any combustion in bores 66, however, would not be prohibitive. The ports 13, 14, in valve 11, should be such, however, as to prevent any combustion within the valve 11. The term fuel fluid is intended to comprehend any fuel bearing fluid, as gaseous fuel or air bearing fuel or liquid.

What I claim is:

1. In an aircraft, a rotor mounting means, an air foil rotor having a rotor hub means rotatably mounted on the rotor mounting means, an air foil blade secured at one end in the rotor hub means and extending generally radially from the rotor hub means in a plane transversely of the axis of the rotor hub means; a conduit formed in the air foil rotor; a valve means interposed in said conduit and carried on the air foil rotor and operable in timed relation cyclically with the rotation of the air foil rotor about the rotor mounting means; a source of fuel fluid under pressure and delivering through said conduit and as said conduit is periodically opened by said valve means; a discharge jet nozzle carried on said air foil blade at a location radially outwardly from the axis of rotation of said air foil rotor and discharging in the plane of rotation of the air foil rotor substantially in the direction of a chord thereof; the said discharge jet nozzle having connection with said conduit to receive fuel fluid, the said valve means being located to control passage of fuel fluid thereto from said source; an air induction port spaced from said discharge jet nozzle and radially inwardly therefrom in the rotor for reception of air from atmosphere, and air conduit formed in said air foil blade and extending from the air induction port to the discharge jet nozzle to conduit air thereto, centrifugal compression of air inducted from atmosphere occurring in said air conduit.

2. The structure as specified in claim 1, and in combination; a pitch change means incorporated with said rotor hub means and operationally connected with said air foil blade to impart pitch change movement thereto, the said air foil blade having oscillative mounting in the rotor hub means to permit oscillation of the air foil blade for pitch change, the said pitch change means having timed relation with said valve means to, by said pitch change means, impart deepened pitch angle to said air foil blade in periods of the rotation of said air foil rotor about the rotor mounting means alternating with the flow of fuel fluid to said discharge jet nozzle as permitted by said valve means and when said fuel fluid does not flow thereto.

3. In an aircraft, a rotor mounting means, an air foil rotor having a rotor hub means rotatably mounted on the rotor mounting means, a plural number of air foil blades, each said air foil blade secured at one end in the rotor hub means and extending generally radially from the rotor hub means; a conduit means formed in said air foil rotor and in each air foil blade and a source of fuel fluid under pressure delivering through said conduit means; each said air foil blade having a discharge jet nozzle carried thereon at a location radially outwardly from the axis of rotation of said air foil rotor and discharging in the plane of rotation of the air foil rotor substantially in the direction of a chord thereof; a valve means interposed in said conduit means and operable in timed relation cyclically with the rotation of the air foil rotor about the rotor mounting means and through which fuel fluid flows as timed thereby to each said discharge jet nozzle; and means to supply air for combustion to each said discharge jet nozzle, the said means to supply air for combustion including an air conduit formed in each said air foil blade and extending longitudinally therein, the said air conduits having an air induction port means thereto located centrally of the circle swept by said discharge jet nozzles for induction of atmospheric air thereto, each said air conduit having a discharge radially outwardly of the air foil blade to the associated discharge jet nozzle, centrifugal compression of inducted air occurring in each said air conduit.

4. The structure as specified in claim 3, and in combination; a pitch change means incorporated with said rotor hub means and operationally connected with said air foil blades to cyclically inpart pitch change movements to each said air foil blade, each said air foil blade having oscillative mounting in said rotor hub means to permit oscillation of the blade for pitch change, the said pitch change means having timed relation with said valve means to cyclically impart deepened pitch angle to each said air foil blade, in cyclical order, in periods of the rotation of the air foil rotor about the rotor mounting means alternating with the flow of fuel fluid to said discharge jet nozzles, as permitted by said valve means, and when said fuel fluid does not flow to a discharge jet nozzle.

5. The structure as specified in claim 3, and in combination; a pitch change means incorporated with said rotor hub means and operationally connected with said air foil blades to cyclically impart pitch change movements to each said air foil blade, each said air foil blade having oscillative mounting in said rotor hub means to permit oscillation of the blade for pitch change, the said pitch change means having timed relation with said valve means to cyclically impart deepened pitch angle to each said air foil blade, in cyclical order, in periods of the rotation of the air foil rotor about the rotor mounting means alternating with the flow of fuel fluid to said discharge jet nozzles, as permitted by said valve means, and when said fuel fluid does not flow to a discharge jet nozzle; the said pitch change means comprising, for each blade, fluid pressure responsive means to effect deepened pitch angle of the blade and a conduit connection to the fluid pressure responsive means from the fuel fluid conduit means of a blade in which distributed fuel fluid is under the distributing pressure at the higher pressure of the cycle in the said fuel conduit means to the associated discharge jet nozzle.

6. In an aircraft, a rotor mounting means, an air foil rotor having a rotor hub means rotatably mounted on the rotor mounting means, a plural number of air foil blades, each said air foil blade secured at one end in the rotor hub and extending generally radially from the rotor hub means; a conduit means formed in said air foil rotor and in each air foil blade and a source of fuel bearing air under pressure delivering through said conduit means; each said air foil blade having a discharge jet nozzle carried thereon at a location radially outwardly from the axis of rotation of said air foil rotor and discharging in the plane of rotation of the air foil rotor substantially in the direction of a chord thereof; a valve means interposed in said conduit means and operable in timed relation cyclically with the rotation of the air foil rotor about the rotor mounting means and through which the fuel bearing air under pressure flows, timed thereby, to each said discharge jet nozzle; means to effect ignition of combustible air and fuel in the said discharge jet nozzles as air and fuel are delivered thereto; an air conduit in each said air foil blade, the said air conduit in each said blade extending longitudinally therein, the said air conduits having an air induction port means thereto located centrally of the circle swept by said discharge jet nozzles for induction of atmospheric air thereto, each said air conduit having a discharge radially outwardly of the air foil blade to the associated discharge jet nozzle, centrifugal compression of inducted atmospheric air occurring in each said air conduit.

7. The structure as specified in claim 6, and in combination; a pitch change means incorporated with said rotor hub means and operably connected with each said air foil blade to impart pitch change movement to each said air foil blade in cyclical order, the said pitch change means having timed relation with said valve means to impart deepened pitch to each said air foil blade in periods of rotation of said air foil rotor about the rotor mounting means alternating with the flow of said fuel bearing air under pressure to each said discharge jet nozzle as permitted by said valve means and when said fuel bearing air under pressure does not flow to an air foil blade.

8. The structure as specified in claim 6, and in combination; a pitch change means incorporated with said rotor hub means and operably connected with each said air foil blade to impart pitch change movement to each said air foil blade in cyclical order, the said pitch change means having timed relation with said valve means to impart deepened pitch to each said air foil blade in periods of rotation of said air foil rotor about the rotor mounting means alternating with the flow of said fuel bearing air under pressure to each said discharge jet nozzle, as permitted by said valve means, and when said fuel bearing air under pressure does not flow to an air foil blade; the said pitch change means comprising, for each said air foil blade, a fluid motor means, all of the said fluid motor means being mounted on said rotor hub means, each said fluid motor means effecting deepened pitch phase for its associated air foil blade, cyclically, each said fluid motor means having in conductive connection with it a connecting conduit thereto and to a mated conduit means for fuel bearing air under pressure of an air foil blade located to receive fuel bearing air under pressure in an opposite phase of the cycle of rotation to the phase of the air foil blade associated with the fluid motor means.

9. In an aircraft, a rotor mounting means, a rotor hub means rotatably mounted on the rotor mounting means, a plural number of air foil blades, each said air foil blade secured at one end in said rotor hub means and extending generally radially outwardly from said rotor hub means; a discharge jet nozzle mounted on each said air foil blade at a location radially outwardly from its mounting in the rotor hub means; a means operably interconnected with said air foil rotor to be operated in cyclical order with its rotation to distribute fluid under pressure to each said discharge jet nozzle in periods cyclically in rotation of the rotor hub means and means to supply fluid under pressure for such distribution; and pitch change means for said air foil blades, comprising, a fluid motor means for each said air foil blade, all of the said fluid motor means being mounted on said rotor hub means, each said fluid motor means effecting deepened pitch phase for its associated air foil blade, cyclically, each said fluid motor means having in conductive connection with it a connecting conduit thereto and to the means for said distribution of fluid under pressure to receive said fluid under pressure in a phase of its pitch change opposite to the phase in which its associated discharge jet nozzle receives fluid under pressure for expulsion from the discharge jet nozzle.

10. The structure as specified in claim 9, and in combination: a means for change of the cyclic phases of supply of said fluid under pressure to change the location of said phases in the cycle of rotation of said air foil rotor, for resultant change of the direction of horizontal thrust of the air foil rotor, in the plane of its rotation.

11. In an aircraft, a rotor mounting means, a rotor hub means rotatably mounted on the rotor mounting means, a plural number of air foil blades, each said air foil blade secured at one end in said rotor hub means and extending generally radially outwardly from said rotor hub means; a discharge nozzle mounted on each said air foil means at a location radially outwardly from its mounting in the rotor hub means; a distributing means operably inter-connected with said rotor hub means to be operated in cyclical order with its rotation to distribute fluid under pressure to each said discharge jet nozzle by a passage thereto and individually related thereto in periods cyclically in rotation of the rotor hub means; a means to supply fluid under pressure to said distributing means for such distribution; a pitch change means for said air foil blades, including, a fluid motor means for each said blade, all of said motor means being carried on said rotor hub means, each said motor means actuably inter-connected with an associated air foil blade to effect pitch change of the blade, each said blade being oscillative in its mounting in the rotor hub means, and an interconnecting conduit for each said motor means between the motor means and a mated one of said passages such mated passage being the passage to the discharge jet nozzle of an air foil blade which is in a phase of its orbit about the axis of rotation of the rotor hub means substantially opposite to the phase of the air foil blade oscillatively actuable by the fluid motor means in its similar said orbit.

12. In an aircraft: a pair of airfoil rotors, each said rotor incorporating; a rotor hub means and a plural number of air foil blades each of which is secured at one end in the rotor hub means and extends generally radially outwardly from the rotor hub means, a plural number of discharge nozzles mounted one on each said air foil blade at a location radially outwardly from its mounting in the rotor hub means; a means for supply of fluid under pressure: a rotor mounting means on which the rotor hub means of each of the said pair of air foil rotors are rotatably mounted to be rotatable on co-incidental axes to permit rotation of the one air foil rotor in a plane spaced away from the plane of rotation of the other: a distributing means comprising; a primary element having a distributing passage for the one air foil rotor and a distributing passage for the other air foil rotor; and a pair of secondary elements, one secondary element associated with one air foil rotor and co-operating with one said distributing passage to procure a periodic cyclic distribution by intermediate interconnecting conduits with the discharge nozzles of the air foil rotor; and the other secondary element associated with the other air foil rotor and co-operating with the other said distributing passage to procure a periodic cyclic distribution by intermediate inter-connecting conduits with the discharge nozzles of said other air foil rotor: a conductive conduit interconnecting said means for supply of fluid under pressure through said distributing means to permit distribution thereby to the discharge nozzles: the said distributing passages of the primary element having a relative location in the cycles of the said secondary elements to effect flow of the fluid under pressure to the discharge nozzles of one air foil rotor in phases of the orbit about its axis which are substantially diametrically opposite to the similar phases of flow in the orbit of the other air foil rotor: and in combination, the said primary element having adjustable mounting on said rotor mounting means to effect change of the relative cooperation of the secondary elements therewith for co-incident change of the distribution cycles by said distributing means to effect co-incident change of the distribution periods of each of the air foil rotors in the orbit of the air foil rotor about its axis, while maintaining the said diametrically opposite relation.

13. The means as specified in claim 12, and in combination; the said primary element being a cyclindrical valve axially co-incident with the rotor hub means, and the said secondary elements being each a valve means circumferentially of the primary element.

14. The means as specified in claim 12, and in combination; pitch change means for the air foil blades of each of the said air foil rotors, the pitch change means for each air foil rotor comprising, a fluid motor means for each air foil blade, all of the fluid motor means of one air foil rotor being mounted on the rotor hub means of the air foil rotor, each fluid motor means effecting deepened pitch phase for its associated air foil blade, cyclically, each said fluid motor means having in conductive connection with it a connecting conduit thereto and to an associated intermediate interconnecting conduit for said distribution of fluid under presure to receive said fluid under pressure in a phase of its pitch change opposite to the phase in which its associated discharge nozzle receives fluid under pressure for expulsion from the discharge nozzle.

15. The means as specified in claim 12, and in combination: the said primary element being a cylindrical valve axially coincident with the rotor hub means, and the said secondary elements being each a valve incorporated with its associated rotor hub means and circumferentially of the said primary element; and the said primary element being adjustable in its mounting by rotation movement in said mounting, the said primary element having in interconnection therewith a control means by which the rotation movement may be effected.

16. The means as specified in claim 12, and in combination: the said rotor mounting means including an axially central shaft and at one end thereof a laterally projected flange forming bearing retaining means at that end of the shaft for one said rotor hub means, and at the other end of the said shaft a sleeve secured with said shaft and spaced therefrom circumferentially, the sleeve having an internally projected flange forming a bearing retaining means for a bearing member of the other rotor hub means.

17. In an aircraft, a fuselage structure and a plural number of rotor unit mounting pylons secured on the fuselage structure, each said mounting pylon having mounted thereon a rotor unit each said rotor unit comprising: a pair of air foil rotors rotatively mounted on the mounting pylon for opposite rotation in substantially parallel planes spaced apart, a means for supply of fluid under pressure, each rotor including, a rotor hub means and a plural number of air foil blades each of which is secured at one end in the rotor hub means and extends generally radially outwardly from the rotor hub means, a plural number of discharge nozzles mounted one on each said air foil blade at a location radially outwardly from the mounting in the rotor hub means, a distributing means for the rotor unit comprising, a primary element having a distributing passage for the one air foil rotor and a distributing passage for the other air foil rotor, a pair of secondary elements one of which is associated with one air foil rotor and co-operative with one said distributing passage to procure a periodic cyclic distribution by individual interconnecting conduits with the discharge nozzles of the air foil rotor, and the other secondary element is associated with the other air foil rotor and co-operative with the other distributing passage to procure a periodic cyclic distribution by individual interconnecting conduits with the discharge nozzles of said other air foil rotor, a conductive conduit interconnecting said means for supply of fluid under pressure through said distributing means to permit distribution thereby to the discharge nozzles, the said distributing passages of the primary element having a relative location in the cycles of the said secondary elements to effect flow of the fluid under pressure to the discharge nozzles of one said air foil rotor of the unit in phases of the orbit about its axis which are substantially diametrically opposite to the similar phases of flow in the orbit of the other air foil rotor, the said primary element of the rotor unit being adjustable in the mounting pylon associated to effect change of the relative cooperation of the secondary elements therewith for coincident change of the distributing cycles by said distributing means to effect coincident change of the distribution periods of each of the pair of air foil rotors of the unit in their orbits about the axis of rotation while maintaining the said diametrically opposite relation.

18. The means as specified in claim 17, and in combination; a pitch change means for each rotor unit for the air foil blades of the air foil rotors of the unit, the pitch change means comprising, a fluid motor means for each air foil blade, all of the fluid motor means of the air foil rotor being mounted on the rotor hub means of the air foil rotor, each fluid motor means effecting deepened pitch phase for its associated air foil blade, cyclically, each said fluid motor means having in conductive connection with it a connecting conduit thereto and to an associated individual interconnecting conduit for said distribution of fluid under pressure to receive said fluid under pressure in a phase of the pitch change opposite to the phase in which the associated discharge nozzle receives fluid under pressure for expulsion from the discharge nozzle.

References Cited in the file of this patent

UNITED STATES PATENTS

| | | |
|---|---|---|
| 1,569,607 | Beck | Jan. 12, 1926 |
| 2,330,056 | Howard | Sept. 21, 1943 |
| 2,429,646 | Pullin | Oct. 28, 1947 |
| 2,457,936 | Stalker | Jan. 4, 1949 |
| 2,601,258 | Brzozowski | June 24, 1952 |
| 2,620,882 | Morain | Dec. 9, 1952 |

FOREIGN PATENTS

| | | |
|---|---|---|
| 27,087 | Great Britain | of 1910 |
| 265,706 | Switzerland | Mar. 16, 1950 |